(12) United States Patent
Weng

(10) Patent No.: US 8,177,404 B2
(45) Date of Patent: May 15, 2012

(54) EDGE-LIT BACK PLATE FOR A PRODUCT RACK

(76) Inventor: Wei-Fan Weng, Taichung (TW)

( * ) Notice: Subject to any disclaimer, the term of this patent is extended or adjusted under 35 U.S.C. 154(b) by 312 days.

(21) Appl. No.: 12/454,344

(22) Filed: May 15, 2009

(65) Prior Publication Data

US 2010/0290214 A1 Nov. 18, 2010

(51) Int. Cl.
*G09F 13/18* (2006.01)
*F21V 7/10* (2006.01)
*F21V 5/00* (2006.01)

(52) U.S. Cl. ........ 362/559; 362/633; 362/634; 362/125; 362/133; 40/546

(58) Field of Classification Search .................. 362/612, 362/559, 632, 633, 634, 92, 94, 125, 133; 40/546
See application file for complete search history.

(56) References Cited

U.S. PATENT DOCUMENTS

| | | | | |
|---|---|---|---|---|
| 1,707,965 A * | 4/1929 | Scantlebury | | 40/546 |
| 1,950,548 A * | 3/1934 | Fuller, Jr. | | 40/546 |
| 3,402,493 A * | 9/1968 | Mellyn et al. | | 40/563 |
| 4,475,298 A * | 10/1984 | Munoz | | 40/546 |
| 4,697,365 A * | 10/1987 | Moosbrugger et al. | | 40/546 |
| 5,537,296 A * | 7/1996 | Kimura et al. | | 362/634 |
| 6,174,065 B1 * | 1/2001 | Schurch | | 362/605 |
| 6,530,164 B2 * | 3/2003 | Gai | | 40/546 |
| 7,083,318 B2 * | 8/2006 | Ha et al. | | 362/633 |
| 7,607,812 B2 * | 10/2009 | Kim | | 362/602 |
| 2003/0128549 A1 * | 7/2003 | Matsuura et al. | | 362/497 |
| 2006/0072345 A1 * | 4/2006 | Ho et al. | | 362/633 |
| 2009/0229154 A1 * | 9/2009 | Sadon | | 40/546 |

* cited by examiner

*Primary Examiner* — Ismael Negron
(74) *Attorney, Agent, or Firm* — William E. Pelton, Esq.; Cooper & Dunham LLP

(57) ABSTRACT

An edge-lit back plate has two mounting frames coupled to opposite longitudinal side surfaces of a back plate including a laminate body with a reflector, a light guide and a diffuser. At least one light source assembly is located within a recess of each mounting frame and positioned adjacent to one of the longitudinal side surfaces of the laminate body. The edge-lit back plate is configured to be installed on a rack to illuminate products on such rack.

15 Claims, 7 Drawing Sheets

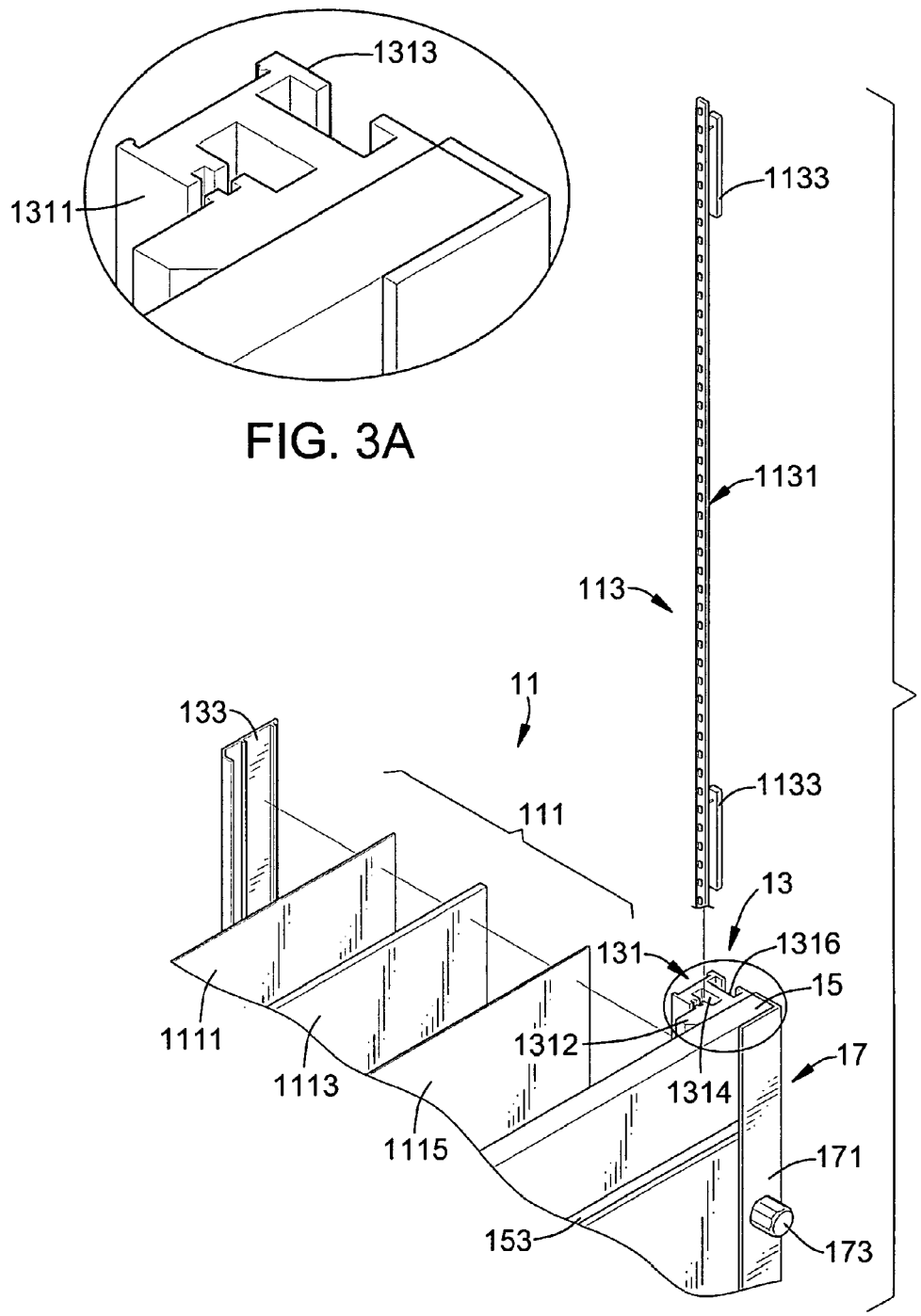

EDGE-LIT BACK PLATE FOR A PRODUCT RACK

BACKGROUND OF THE INVENTION

1. Field of Invention

The present invention relates to a plate, and more particularly to a luminescent back plate that is assembled with a product rack.

2. Description of the Related Art

Product racks are used for store and place goods thereon in a shopping center or a convenient store, so that customers or buyers may easily see and pick goods that they want. With reference to FIG. 6, a conventional product rack (90) has two side frames (91), a back plate (92) and at least one shelf (93). The side frames (91) are mounted adjacent to the back plate (92) and the shelves (93) are mounted transversely therebetween. Goods are placed on the shelf (93). However, the conventional product rack (90) is too simple and crude to catch a buyer's attention and increase purchasing desire.

The present invention provides a luminescent back plate, which is mounted on a rack, thereby providing surface light to attract customer's attention.

SUMMARY OF THE INVENTION

The primary objective of the present invention is to provide a luminescent back plate being mounted with a rack, where the luminescent back plate provides light and accentuates goods in front thereof to catch a buyer's attention.

The luminescent back plate has a back light module and two mounting frames. The back light module has a body and at least one light source assembly. The body is a laminate comprising a reflector, a light guide and a diffuser and has two longitudinal side surfaces, a front surface and a bottom surface. The at least one light source assembly is located adjacent to one of the longitudinal side surfaces of the body and has a light emitting side. The light emitting side faces toward one of the two longitudinal side surfaces. The mounting frames are respectively disposed adjacent to the longitudinal side surfaces and are mounted on the longitudinal side surfaces of the body. The luminescent back plate may be installed on a rack and provides a surface light to catch customers' attention.

Other objectives, advantages and novel features of the invention will become more apparent from the following detailed description when taken in conjunction with the accompanying drawings.

BRIEF DESCRIPTION OF THE DRAWINGS

FIG. 3 is an enlarged exploded perspective view of the luminescent back plate in FIG. 1;

FIG. 3A is an enlarged perspective view of the of the luminescent back plate in FIG. 3;

DETAILED DESCRIPTION OF THE INVENTION

Figure 1:
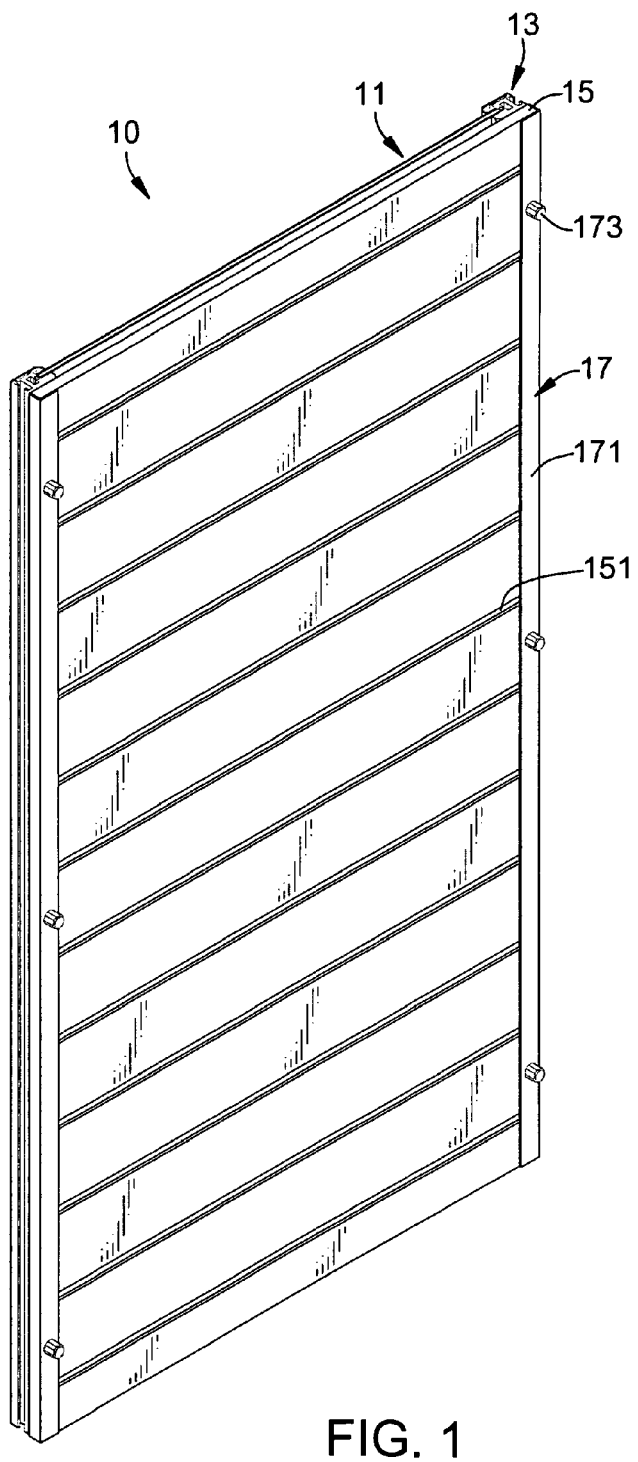
FIG. 1 is a perspective view of a luminescent back plate in accordance of the present invention.
Figure 2:
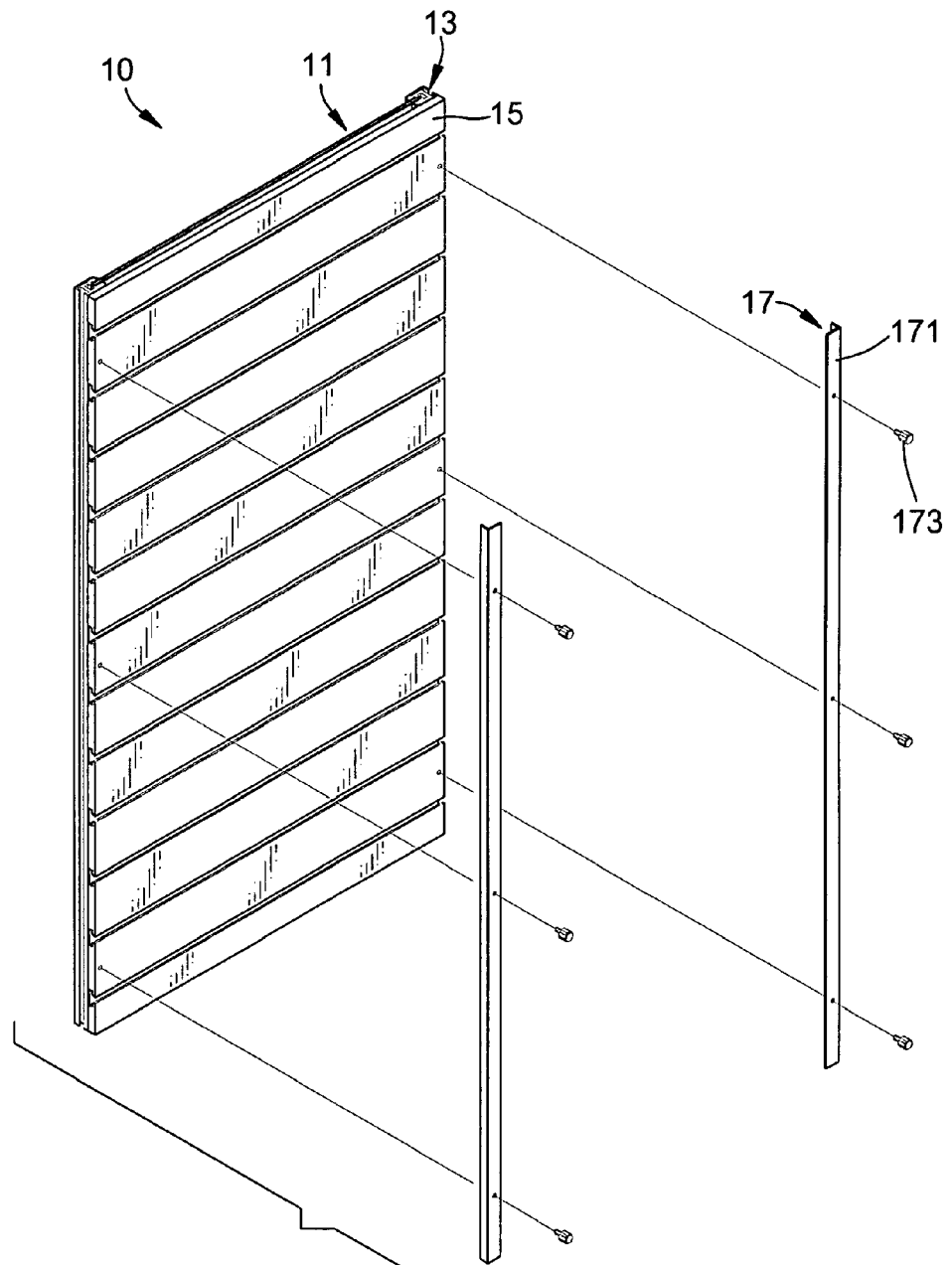
FIG. 2 is a partially exploded perspective view of the luminescent back plate in FIG. 1.
Figure 3B:
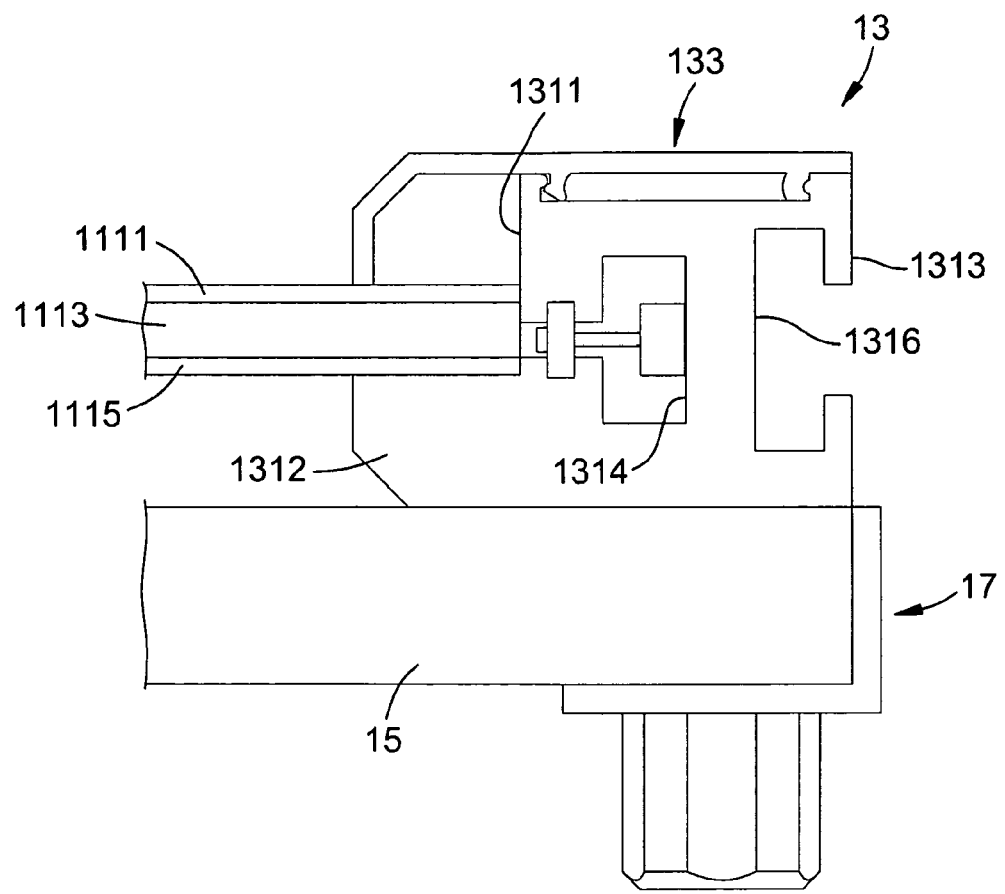
FIG. 3B is an enlarged partial top view of the of the luminescent back plate in FIG. 3.

With reference to FIGS. 1, 2, 3, 3A, 3B and 5, a luminescent back plate (10) for product rack in accordance with the present invention comprises a back light module (11) and two mounting frames (13) and may have a slot plate (15), two fixing assemblies (17) and a pattern sheet (18).

The back light module (11) has a body (111) and at least one light source assembly (113). The body (111) is a rectangular plate and is a laminate comprising a reflector (1111), a light guide (1113) and a diffuser (1115) and has two longitudinal side surfaces, a front surface and a bottom surface. The at least one light source assembly (113) is shaped corresponding to and is located adjacent to one of the longitudinal side surfaces of the body (111) and has a light emitting side. The light emitting side faces toward a corresponding longitudinal side surface.

The light source assembly (113) may be a cold cathode fluorescent lamp (CCFL) or a bar-like LED (light emitting diode) assembly. The bar-like LED assembly has an LED module (1131) and at least one driving chip (1133). The LED module (1131) has a bar-like printed circuit board (PCB) and multiple LEDs being mounted on the bar-like PCB. The LEDs may be grouped as multiple LED sets.

The at least one driving chip (1133) is electronically connected to the LEDs via the bar-like PCB. When only one driving chip (1133) is adopted, all LEDs are electronically connected to the driving chip (1133). When multiple driving chips (1133) are adopted, the driving chips (1133) are respectively connected successively to the LED sets, thereby, each driving chip (1133) drives a corresponding LED set to emit light toward the body (111).

When the light is guided into the body (111) from the longitudinal side surfaces, the light guide (1113) guides the light therein until the reflector (1111) reflects the light. Reflected light is then emitted toward and through the diffuser (1115), thereby, the body (111) is able to generate a uniform surface light from the front surface. The driving chips (1133) may selectively drive the corresponding LED sets to adjust a brightness of the uniform surface light.

The mounting frames (13) are respectively mounted on the longitudinal side surfaces of the body (111). Each mounting frame (13) has a frame base (131) and a clamping cover (133).

The frame base (131) has a connecting surface (1311), an outer surface (1313), a clamping flange (1312), a light source recess (1314) and an optional rack connecting structure (1316). The outer surface (1313) is against [[a]] the connecting surface (1311).

The connecting surface (1311) of each frame base (131) is attached to one of the longitudinal side surfaces of the body (111). The clamping flange (1312) protrudes from the connecting surface (1311) and is attached to the front surface of the body (11) near a corresponding longitudinal surface.

The light source recess (1314) is shaped corresponding to the light source assembly (113), is formed in the connecting surface (1311) and holds the light source assembly (113).

The rack connecting structure (1316), may be a flange, protrudes from the outer surface (1313), or a recess formed in the outer surface (1313), and is used for mounting with a rack.

The clamping cover (133) is detachably mounted on the frame base (131) opposite to the clamping flange (1312) and is attached to the bottom surface of the body (111), thereby, holding the body (111) on the mounting frame (13) with the clamping flange (1312).

Figure 4:
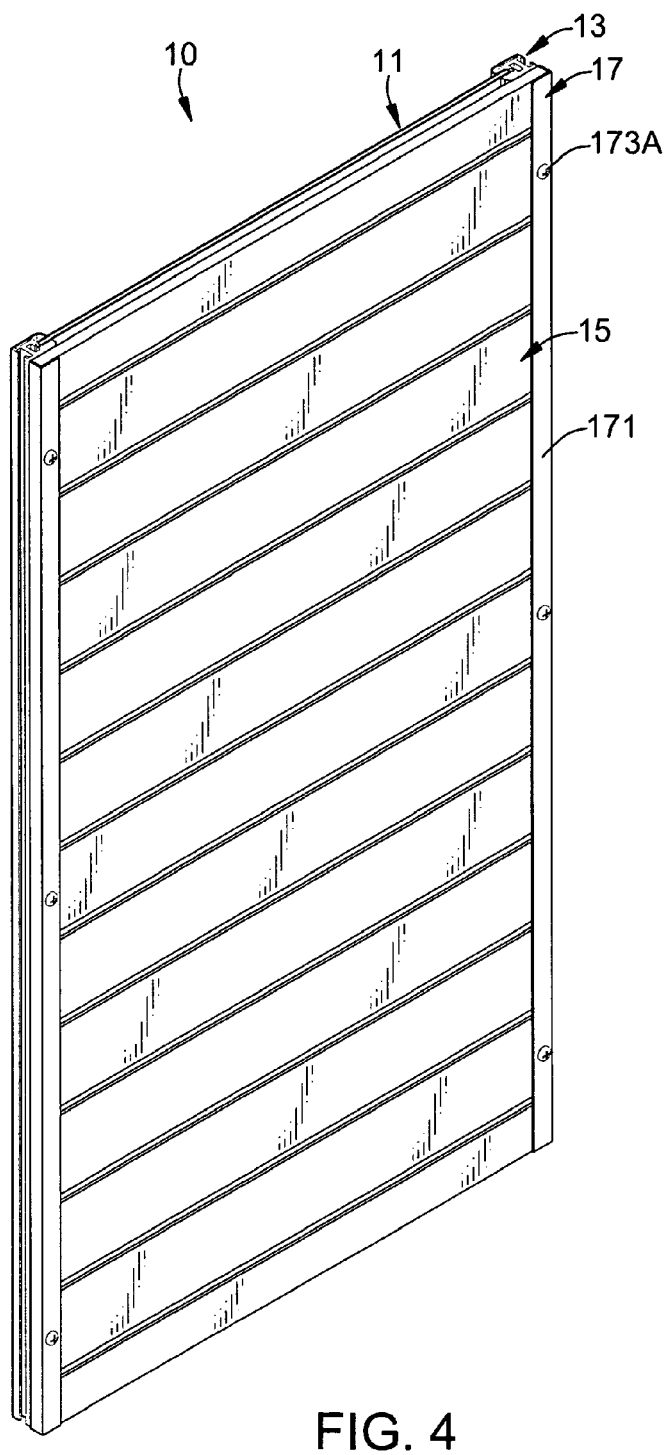
FIG. 4 is a perspective view of a luminescent back plate having keyed screws in accordance of the present invention.
Figure 5:
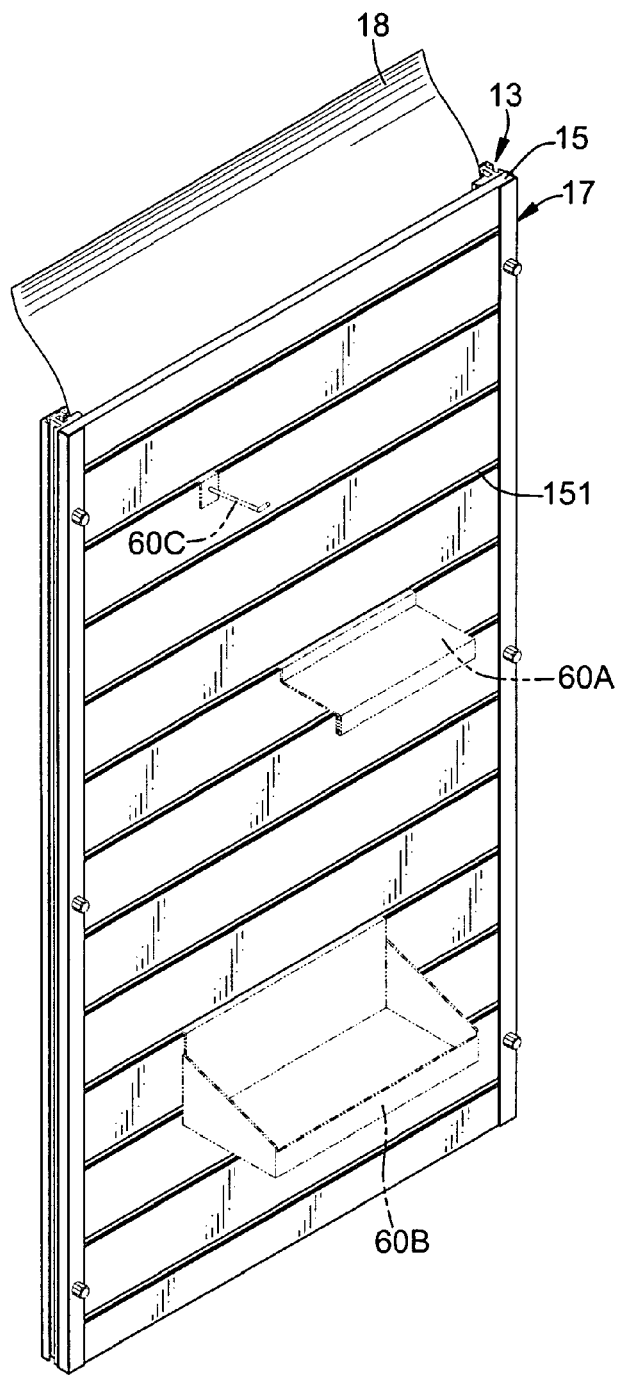
FIG. 5 is a perspective view of a luminescent back plate having a transparent pattern sheet in accordance of the present invention.
Figure 6:
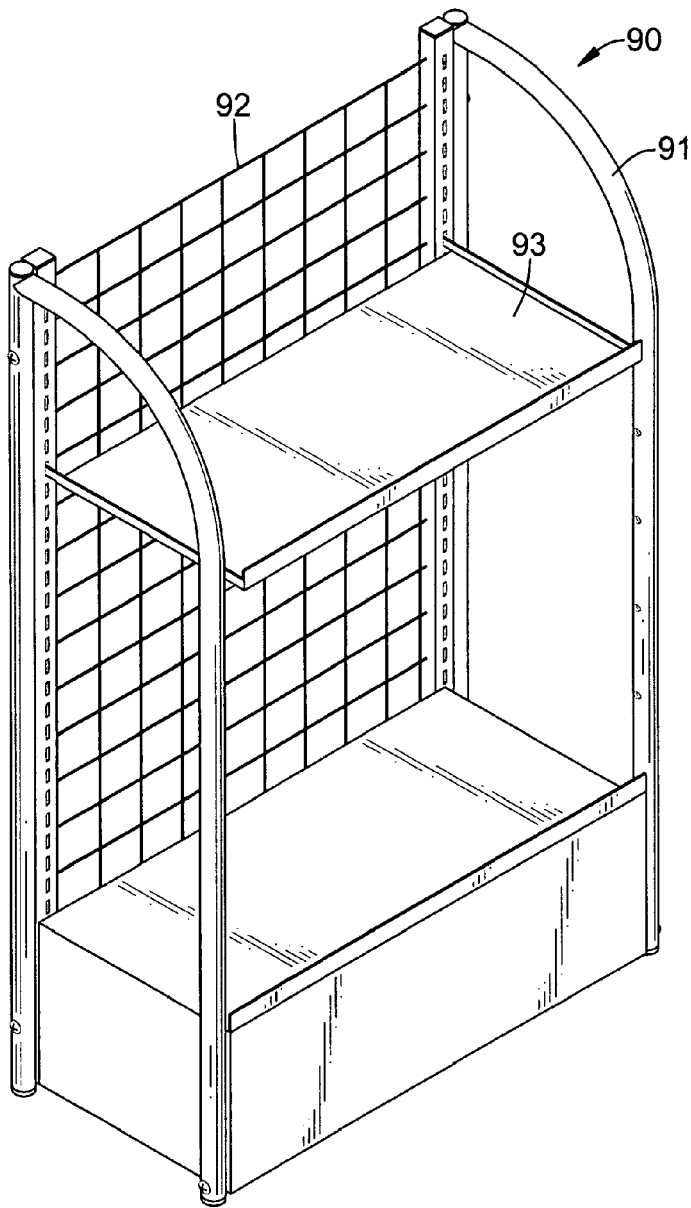
FIG. 6 is a conventional product rack in accordance with the prior art.

With reference to FIGS. 4 and 5, the slot plate (15) is transparent, is shaped corresponding to the back light module (11) and is located on the front surface of the body (111). The slot plate (15) has a front surface and multiple slots (151). The slots (151) are separately formed in the front surface of the slot plate (15) and may be formed vertical to the longitudinal side surfaces. The slots (151) are designed to hold a variety of shelves (60A, 60B, 60C), where each shelf (60A, 60B, 60C) is used for placing products and goods thereon and each shelf (60A, 60B, 60C) has a hook being mounted in and held in the slots (151). To prevent the shelves (60A, 60B, 60C) from loosening from the slot (151), a cross section of slot (151) may have a locking means, such as but not limited to, a larger bottom than opening, the cross section of slot (151) may be shaped as an L or inverted T.

The two fixing assemblies (17) respectively correspond to the mounting frames (13) and securely mount the slot plate (15) on the back light module (11). Each fixing assembly (17) may have multiple keyed screws (173A, in FIG. 4) or hand screws (173, in FIG. 3) that are separately aligned with each other and are located corresponding to one mounting frame (13). Each fixing assembly (17) mounts the slot plate (15) on a corresponding mounting frame (13). Each fixing assembly (17) may further have a corner strip (171) being mounted on the slot plate (15) and the corresponding mounting frame (13) and is securely mounted on the slot plate (15) with the keyed screws (173A) or hand screws (173).

The pattern sheet (18) is a transparent sheet that has a pattern thereon. The pattern may be colored, may be a logo, trade name or mark, word, drawing or the like. The pattern sheet (18) is mounted between the back light module (11) and the slot plate (15).

When the luminescent back plate (10) serves as a back plate of the rack and goods are placed on the rack in front of the luminescent back plate (10), customers entering a store will be attracted by the goods in front of the luminescent back plate (10) since the luminescent back plate (10) brightens and highlights the goods.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A luminescent back plate comprising
    a back light module having
        a body being a rectangular plate and being a laminate comprising a reflector, a light guide and a diffuser and having two longitudinal side surfaces, a front surface and a bottom surface; and
        at least one light source assembly being shaped corresponding to and located adjacent to one of the longitudinal side surfaces of the body and having a light emitting side, the light emitting side facing toward a corresponding one longitudinal side surface; and
    two mounting frames being respectively mounted on the two longitudinal side surfaces of the body, and each mounting frame having
        a frame base having
            a connecting surface attached to one of the longitudinal side surfaces of the body;
            an outer surface being against the connecting surface;
            a clamping flange protruding from the connecting surface and attached to the front surface near a corresponding longitudinal surface; and
            a light source recess being shaped corresponding to one of the at least one light source assembly and being formed in the connecting surface, wherein each one of the at least one light source assembly is held in the light source recess in one of the mounting frames; and
        a clamping cover being detachably mounted on the frame base opposite to the clamping flange and attached to the bottom surface of the body to hold a corresponding longitudinal side surface of the body on the mounting frame with the clamping flange.

2. The luminescent back plate as claimed in claim 1, wherein the at least one light source assembly is a cold cathode fluorescent lamp.

3. The luminescent back plate as claimed in claim 1, wherein the at least one light source assembly is a bar-like light emitting diode (LED) assembly, the bar-like LED assembly having
    an LED module having a bar-like printed circuit board (PCB) and multiple LEDs being mounted on the bar-like PCB, wherein the LEDs are grouped as at least one LED set; and
    at least one driving chip being electronically connected to the bar-like PCB, the at least one driving chip being connected to a corresponding LED set to drive the corresponding LED set to emit light toward the body.

4. The luminescent back plate as claimed in claim 3, wherein the luminescent back plate further has a pattern sheet being a transparent sheet having a pattern thereon, and the pattern sheet is mounted between the back light module and the slot plate.

5. The luminescent back plate as claimed in claim 4, wherein the frame base further has a rack connecting structure being formed on the outer surface of the frame base.

6. The luminescent back plate as claimed in claim 1, wherein the luminescent back plate further has a slot plate being transparent, being shaped corresponding to the back light module, being located on the front surface of the body and having a front surface and multiple slots being separately formed in the front surface of the slot plate and vertical to the longitudinal side surfaces.

7. The luminescent back plate as claimed in claim 6, wherein the at least one light source assembly is a cold cathode fluorescent lamp.

8. The luminescent back plate as claimed in claim 6, wherein the at least one light source assembly is a bar-like LED assembly, the bar-like LED assembly having
    an LED module having a bar-like PCB and multiple LEDs being mounted on the bar-like PCB, wherein the LEDs are grouped as at least one LED set; and
    at least one driving chip being electronically connected to the bar-like PCB, the at least one driving chip being connected to a corresponding LED set to drive the corresponding LED set to emit light toward the body.

9. The luminescent back plate as claimed in claim 8, wherein the luminescent back plate further has a pattern sheet being a transparent sheet having a pattern thereon, and the pattern sheet is mounted between the back light module and the slot plate.

10. The luminescent back plate as claimed in claim 9, wherein the frame base further has a rack connecting structure being formed on the outer surface of the frame base.

11. The luminescent back plate as claimed in claim 6, wherein the luminescent back plate further has two fixing assemblies being respectively located corresponding to the mounting frames and each fixing assembly having
- a corner strip being mounted on the slot plate and a corresponding mounting frame; and
- multiple screws being separately aligned with each other to mount the slot plate on the corresponding mounting frames.

12. The luminescent back plate as claimed in claim 11, wherein the at least one light source assembly is a cold cathode fluorescent lamp.

13. The luminescent back plate as claimed in claim 11, wherein the at least one light source assembly is a bar-like LED assembly, the bar-like LED assembly having
- an LED module having a bar-like PCB and multiple LEDs being mounted on the bar-like PCB, wherein the LEDs are grouped as at least one LED set; and
- at least one driving chip being electronically connected to the bar-like PCB, the at least one driving chip corresponding to and being connected to a corresponding LED set to drive the corresponding LED set to emit light toward the body.

14. The luminescent back plate as claimed in claim 13, wherein the luminescent back plate further has a pattern sheet being a transparent sheet having a pattern thereon, and the pattern sheet is mounted between the back light module and the slot plate.

15. The luminescent back plate as claimed in claim 14, wherein the frame base further has a rack connecting structure being formed on the outer surface of the frame base.

* * * * *